(12) United States Patent
Grison et al.

(10) Patent No.: US 8,875,818 B2
(45) Date of Patent: Nov. 4, 2014

(54) TILLER GUIDED INDUSTRIAL TRUCK

(71) Applicant: Jungheinrich Aktiengesellschaft, Hamburg, DE (US)

(72) Inventors: Monte Grison, Cypress, TX (US); Scott Tosten, Cypress, TX (US); Carsten Harnisch, Houston, TX (US)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 13/889,845

(22) Filed: May 8, 2013

(65) Prior Publication Data

US 2014/0102814 A1    Apr. 17, 2014

Related U.S. Application Data

(60) Provisional application No. 61/714,117, filed on Oct. 15, 2012.

(51) Int. Cl.
| | |
|---|---|
| *B62D 51/04* | (2006.01) |
| *B66F 17/00* | (2006.01) |
| *B62D 51/02* | (2006.01) |
| *B66F 9/24* | (2006.01) |
| *B66F 9/075* | (2006.01) |

(52) U.S. Cl.
CPC .............. *B62D 51/04* (2013.01); *B66F 17/003* (2013.01); *B62D 51/02* (2013.01); *B66F 9/24* (2013.01); *B66F 9/07568* (2013.01)
USPC ........................................................ 180/19.3

(58) Field of Classification Search
CPC ....... B62D 51/04; B62D 51/001; B62D 51/02
USPC ....................................... 180/19.1, 19.2, 19.3
See application file for complete search history.

(56) References Cited

U.S. PATENT DOCUMENTS

| | | | |
|---|---|---|---|
| 3,791,474 A * | 2/1974 | Stammen et al. ............. | 180/332 |
| 4,716,980 A | 1/1988 | Butler | |
| 5,245,144 A | 9/1993 | Stammen | |
| 5,964,313 A | 10/1999 | Guy | |
| 6,464,025 B1 | 10/2002 | Koeper et al. | |
| 6,595,306 B2 | 7/2003 | Trego et al. | |
| 6,776,249 B2 * | 8/2004 | Fortin ........................ | 180/19.3 |
| 7,665,555 B2 * | 2/2010 | Rose et al. .................. | 180/19.2 |

* cited by examiner

*Primary Examiner* — Kevin Hurley
(74) *Attorney, Agent, or Firm* — Walter Ottesen P.A.

(57) ABSTRACT

A tiller guided industrial truck having a steered wheel, a tiller arm, a travel speed controller, an actuating unit, a hold device, and a high speed travel switch. The tiller arm is pretensioned toward a vertical or near vertical position. The hold device limits a maximum travel speed to a walk along speed when activated and provides a snap-in position for the tiller arm in which the tiller arm is held. Further, the industrial truck has a circuit that initializes a braking process when the travel speed controller is not actuated while the high speed travel switch is activated.

15 Claims, 5 Drawing Sheets

TILLER GUIDED INDUSTRIAL TRUCK

CROSS REFERENCE TO RELATED APPLICATION

This application claims priority of U.S. provisional patent application No. 61/714,117, filed Oct. 15, 2012, the entire content of which is incorporated herein by reference.

FIELD OF THE INVENTION

The present invention relates to a tiller guided industrial truck which has an operator's platform. In particular, the invention relates to industrial trucks which are referred to as walkie/rider pallet trucks.

BACKGROUND OF THE INVENTION

U.S. Pat. No. 4,716,980 discloses an electrical rider vehicle which has a dead man's switch which triggers the application of brakes. The known vehicle is equipped with a control which releases the brake and enables normal transport operation of the vehicle at different speeds by an operator on the operator's platform. The control has a selector switch in order to switch between a normal operating mode and a coasting operating mode. In the coasting operating mode, the mechanical brake is released and the propulsive drive is actuated via a jog switch which is provided on the side of the vehicle and can be actuated by an operator walking alongside. During use, the operator can, when the desired location has been reached, switch the vehicle into the coasting operating mode and thus keep the brake released. The operator can leave the operator's platform and the vehicle continues to coast for a short distance before stopping. Subsequently, the operator can actuate the jog switch so that the vehicle moves at a walking speed, with the user walking alongside the vehicle. If the jog switch is released, the vehicle again coasts to a standstill.

U.S. Pat. No. 5,245,144 discloses a switch assembly on the head of a tiller arm which has a pair of switches which can be actuated by an operator walking alongside the vehicle. Through an actuation of the switch, the vehicle travels next to the operator at walking speed.

U.S. Pat. No. 5,964,313 discloses an industrial walkie truck which has a dead man's switch. A high speed operating mode and a low speed operating mode are provided for operation. Further, a coasting system is provided to automatically bypass the dead man's switch of the vehicle when the latter is in a slow driving operating mode. Coasting operation is ended when the high speed operating mode is activated. In the high speed operating mode the dead man's switch automatically positions the tiller arm in a vertical or horizontal position in which the vehicle is decelerated.

U.S. Pat. No. 6,464,025 discloses an industrial walkie truck in which the tiller arm is held in a substantially horizontal position by a holding device. The holding device prevents the tiller arm from automatically positioning itself in its vertical braking position so that a dead man's switch is bypassed during coasting operation. The known industrial walkie truck also has a mechanical high speed travel button which, when actuated, enables the vehicle to be operated at a higher speed than walking speed. As a result of the actuation of the high speed travel button, the holding device for the tiller arm is released so that the dead man's switch is automatically activated again in the high speed mode.

U.S. Pat. No. 5,595,306 discloses an industrial walkie truck which has a jog switch. During coasting operation, the vehicle can be accelerated by actuation of the jog switch, in order to roll to standstill in the direction of a pick-up point located nearby. In order to activate the vehicle brake, a coasting terminating switch is provided which activates a dead man's switch for the vehicle brakes. The known vehicle is further equipped with a direction-detection means for a steered wheel wherein the jog switch is blocked when the steered wheel is not directed straight ahead.

U.S. Pat. No. 7,665,555 B2 discloses a tiller guided industrial truck which, during an activated coasting operation, keeps the tiller arm in a position determined by the operator. The tiller arm is held in the position via a hydraulic cylinder wherein a movement of the tiller arm in a first direction is impeded while a movement of the tiller arm in a second, independent direction can take place unhindered. When the coasting operation is ended, the tiller arm is hydraulically released again.

In the aforementioned state of the art, a dead man's switch is always provided for safety reasons, the dead man's switch being temporarily bypassed for coasting operation of the vehicle by holding the tiller arm. When changing from coasting operation to high speed operation, the holding of the tiller arm is always lifted in order to provide a dead man's switch for the high speed operation. What is disadvantageous with this approach is that the held tiller arm is always released even for high speed operation of very short duration.

SUMMARY OF THE INVENTION

It is an object of the invention to provide a tiller guided industrial truck, in particular a tiller guided walkie/rider industrial truck, which is also comfortable to operate during the transition from coasting operation to high speed operation.

The tiller guided industrial truck is configured as an industrial walkie truck having an operator's platform. The industrial truck has at least one steered wheel. A tiller arm, which can be pivoted about a vertical axis, determines the steering angle of the steered wheel. The tiller arm can further be pivoted about a horizontal axis, with the tiller arm being biased into a vertical position or near vertical position. As used herein, vertical position describes the position of the tiller arm at one end of the travel path of the tiller arm pivoting around the horizontal axis. Thus, vertical position connotes a vertical position or a near vertical position of the tiller arm.

Preferably, braking of the vehicle is triggered when the tiller arm is in the vertical position. The vehicle is further equipped with a travel speed controller via which a travel speed can be set. The industrial truck is equipped with a holding device for the tiller arm. The holding device is activated via an actuation element. In the activated state of the holding device, the maximum travel speed of the vehicle is limited to a walk along speed, which allows the operator to comfortably walk alongside the truck instead of standing on the operator's platform. Further, the active holding device provides a snap-in position for the tiller arm. In the snap-in position, the tiller arm is held in an intermediate position between the horizontal position and the vertical position and does not return to its vertical position on its own. Additionally, the industrial truck is equipped with a high speed travel button, which, when the holding device is activated, disables the limiting of the maximum travel speed in its permanently actuated state. According to the invention, it is provided that the tiller arm remains in its snap-in position when the high speed travel button is actuated. In order to nonetheless provide a dead man's switch, when the high speed travel button is actuated, a braking process of the industrial truck is triggered when the travel speed controller is not actuated, while the high speed travel button is actuated.

The industrial truck thus has a dead man's switch when the tiller arm is held in a high speed mode, the dead man's switch requiring simultaneous actuation of the travel speed controller and the high speed travel button. As a result, it is possible to switch, with the tiller arm being held in the snap-in position, from coasting operation of the vehicle to high speed travel mode and at the same time to provide a dead man's switch for this high speed travel mode.

DETAILED DESCRIPTION OF THE INVENTION

In a preferred embodiment, the tiller arm is released from its snap-in position by being pivoted about its horizontal axis. By way of a preferably small pivot movement upwards, the tiller arm can leave the snap-in position and reach its vertical position on its own. Preferably, the vertical position is formed as the braking position which triggers a braking process of the vehicle. The self-actuated pivoting of the tiller arm into its vertical position forms a second dead man's switch which ensures automatic braking of the vehicle when the tiller arm is out of its snap-in position.

Further, the tiller arm is released out of its snap-in position through a downward pivot movement and can trigger a braking process by pivoting fully into a lower braking position. Preferably, an electric vehicle brake is provided in the industrial truck. When the dead man's switch is activated, the industrial truck can additionally or exclusively be regeneratively braked.

The holding device has a rotatable actuating element which interacts with a retaining pin which is arranged so as to be movable in its longitudinal direction, wherein when the holding device is activated, the retaining pin is directed toward the tiller arm and, when the holding device is not activated, the retaining pin is rotated out of its position directed toward the tiller arm. Preferably, the tiller arm is provided with a cam on its end directed toward the holding device, the cam abutting the retaining pin in the snap-in position of the tiller arm and preventing the tiller arm from pivoting into its vertical position. Preferably, the holding device has a position switch. This position switch detects a rotational position of the actuating element and triggers a limiting of the maximum travel speed to the walk along speed. This rotational position activates the holding device.

Preferably, the walk along speed is of from 4 km/h to 8 kg/h and more preferably the walk along speed is 5.6 km/h. In a preferred embodiment, the maximum travel speed is of from 8.1 km/h to 16 km/h. In another preferred embodiment, the maximum travel speed is 9 km/h. In yet another preferred embodiment, the maximum travel speed is 15 km/h.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
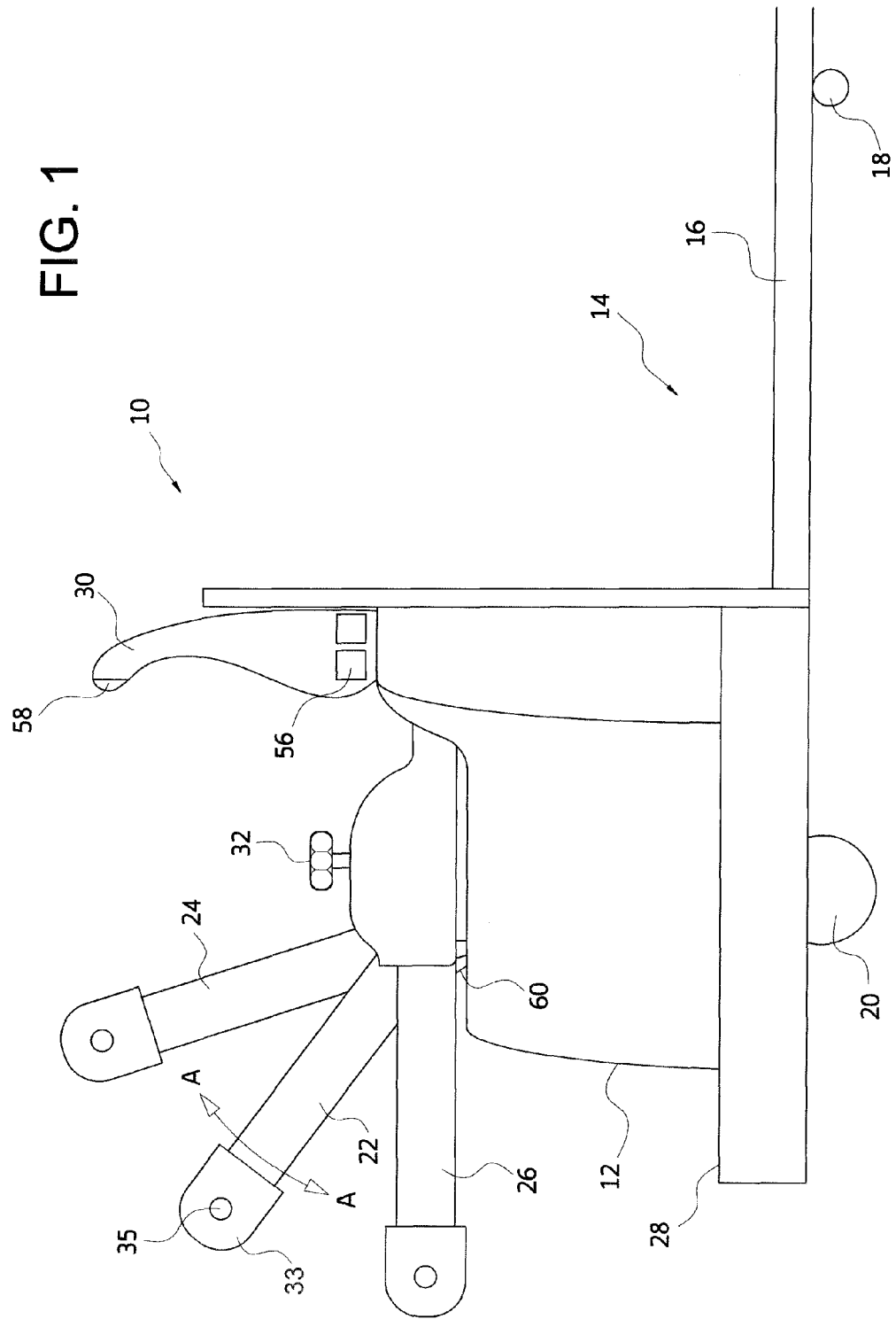
FIG. 1 shows an industrial walkie truck in a schematic view from the side.

FIG. 1 shows an industrial truck 10 having a drive part 12 and a load part 14. The load part 14 comprises a pair of load forks 16 which are supported via load rollers 18. As a basic principle, in the case of tiller guided industrial trucks, the invention can be realized with differently configured load parts 14.

The drive part 12 has a steered and driven wheel 20 which is steered via a tiller arm 22. The tiller arm 22 is pivotable in the longitudinal direction of the vehicle along the double arrow A. In this case, the tiller arm 22 can assume the vertical position indicated by 24 and the horizontal position indicated by 26. The drive part 12 further has an operator's platform 28 at its end facing away from the load part 14. Additionally, the drive part 12 is provided with a grab handle 30 for the operator. An actuating knob 32, which is configured as a rotary knob and activates the holding device for the tiller arm 22, is provided between the grab handle 30 and tiller arm 22.

During operation, the travel speed of the tiller guided industrial truck can be controlled by a travel speed controller 35 provided on the tiller head 33. As a result of the tiller arm being pivoted, along the double arrow A, the vehicle can be braked via an electric brake. Here, the indicated vertical position 24 and the lower horizontal position 26 are each the braking position of the tiller arm 22 in which the electric brake is activated.

In the industrial truck, the tiller arm 22 is configured in such a manner that when it is released at any angular position it moves automatically into the vertical position 24 and triggers braking of the vehicle. For this purpose, the tiller arm 22 is resiliently biased in the upward direction by a spring 60. As noted above, the vertical position 24 does not necessarily have to be vertical in space but rather is located essentially only in the upper angle range of the tiller arm in which the brake is activated. The braking process on the industrial truck can also be triggered by manually pivoting the tiller arm 22 into its lower horizontal position 26. During standard operation of the vehicle, the automatic displacement into the vertical position of the tiller arm constitutes a dead man's switch which ensures that the vehicle is actively braked when the operator releases the tiller arm.

As a result of a rotation of the actuating knob 32 through approximately 90°, a snap-in position is created for the tiller arm. This snap-in position can be a middle position between the shown positions 24 and 26, for example the middle position of the tiller arm 22 shown in FIG. 1. When the holding device is activated, the tiller arm can be moved into its snap-in position, wherein a holding arm disposed above the snap-in position can foe actively brought into the snap-in position by manual downward actuation, while a tiller arm disposed below the snap-in position reaches the provided snap-in position on its own and remains therein. The holding device provides exactly one holding position for the holding arm.

Figure 2:
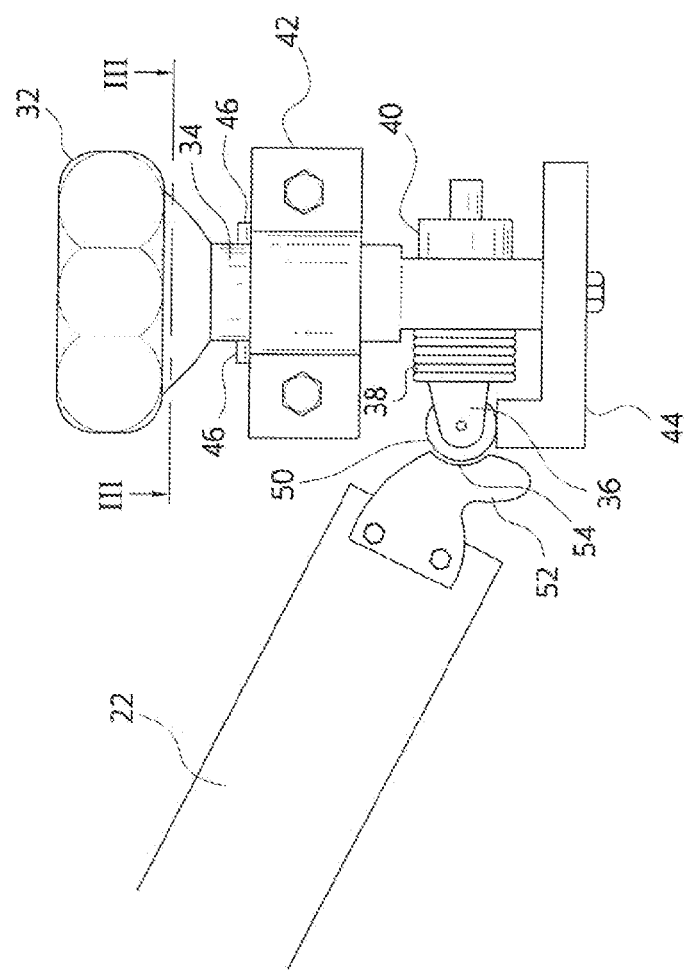
FIG. 2 shows a schematic configuration of the holding/lock device.

FIG. 2 shows the manner in which the holding device functions in a schematic configuration. The holding device has a rotatable actuating knob 32 which rotates a shaft 34 in which there is provided a retaining pin 36, which is arranged in its longitudinal direction transversely to the shaft 34. The retaining pin 36 is biased in the direction of the tiller arm 22 via a spring 38. The retaining pin 36 is held in the shaft 34 via a nut 40. The shaft 34 is rotatably mounted in a block 42 and is supported on a carrier 44. A protruding pin 46 is additionally provided on the shaft 34. In the shown position of the actuating knob 32, the pin 46 can actuate a switch 48 which results in a reduction of the maximum permissible travel speed to a walk along speed. In the rotated position, not shown, of the holding device, in which the retaining pin 36 does not face in the direction of the tiller arm 22, the pin 46 can collide with a stop (not shown) which prevents further rotation of the actuating knob 32.

In the shown embodiment, the retaining pin 36 is provided with a cam follower 50. The cam follower 50 interacts with a cam 52 provided on the tiller arm 22, the cam 52 providing a snap-in position for the tiller arm 22 by way of its recess 54.

Figure 3:
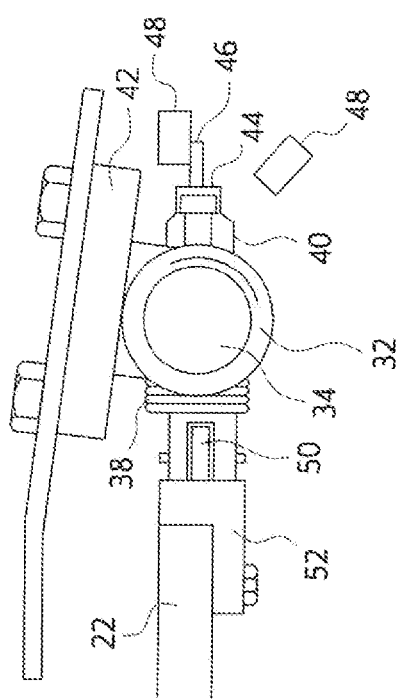
FIG. 3 is a section view taken along line III-III of FIG. 2.

During operation of the industrial truck, the holding device can be activated by rotating the control knob 32 in the direction of arrow B depicted in FIG. 3. As a result of the rotation, the pin 46 comes into contact with the switch 48 and the maximum travel speed of the vehicle is reduced via vehicle control 90. At the same time, the retaining pin 36 reaches a position which faces the tiller arm 22 and its cam 52. In the snap-in position provided by the retaining pin 36 and its cam follower 50, the tiller arm 22 is also held in the snap-in position counter to its spring pretension toward the vertical position. In this position of the holding arm, a coasting operation occurs in a manner known per se. As a result of the tiller arm being held in the snap-in position, there is no dead man's switch for the industrial truck and the operator can accelerate the vehicle to a walking speed via the schematically illustrated jog switch 56. If the jog switch 56 is released then, correspondingly, the vehicle rolls to a standstill. In this operating state, the industrial truck has no dead man's switch which activates an electric brake or triggers regenerative braking for the steered and driven wheel 20. If the operator wants to actively brake the vehicle in this operating mode, he can, for example, move the tiller arm 22 up out of its snap-in position so that it can move into its vertical position on its own. The operator can also move the tiller arm out of its snap-in position into the lower braking position 26 without expending much physical effort.

The industrial truck is additionally equipped with a high speed travel button 58. As a result of an actuation of the high speed travel button 58, the speed limiting is removed and the vehicle can be accelerated via the travel speed controller 35. In this case, the tiller arm remains in its snap-in position. The dead man's switch for the vehicle is achieved in this operating mode with a held tiller arm in that braking is triggered when the travel speed controller 35 is not actuated simultaneously with the high speed travel button 58. As soon as the operator releases the travel speed controller 35, regenerative braking of the vehicle is triggered, preferably with a short delay of approximately 0.5 seconds. Similarly, the high speed travel mode is left again and a switch is made to the coasting operation as soon as the high speed travel button 58 is no longer being actuated. In this manner, a dead man's switch for the vehicle is achieved in the operating mode with a held tiller arm 22 by the high speed travel button 58 together with the travel speed controller 35. The industrial truck herein is thus characterized by two separate dead man's switches for its operating modes.

In this disclosure, the term activating and the grammatical variations thereof are used to connote that a control, such as a button, a switch, a lever, or a knob and the like are operated by the operator once to activate the function of the control. For example, a button is pushed by the operator and the functionality is available until the button is pushed again or another operation of the truck overwrites the function provided by the button. By contrast, the term actuating and the grammatical variations thereof connote that a control is continuously operated by the operator and the function of the control is no longer performed when the operator lets go off the control. For example, a button may have to be continuously held to achieve its function. However, it is possible that a control has to be activated in a first operational mode and that the same control has to be actuated in a second operational mode to achieve its function.

Figure 4:
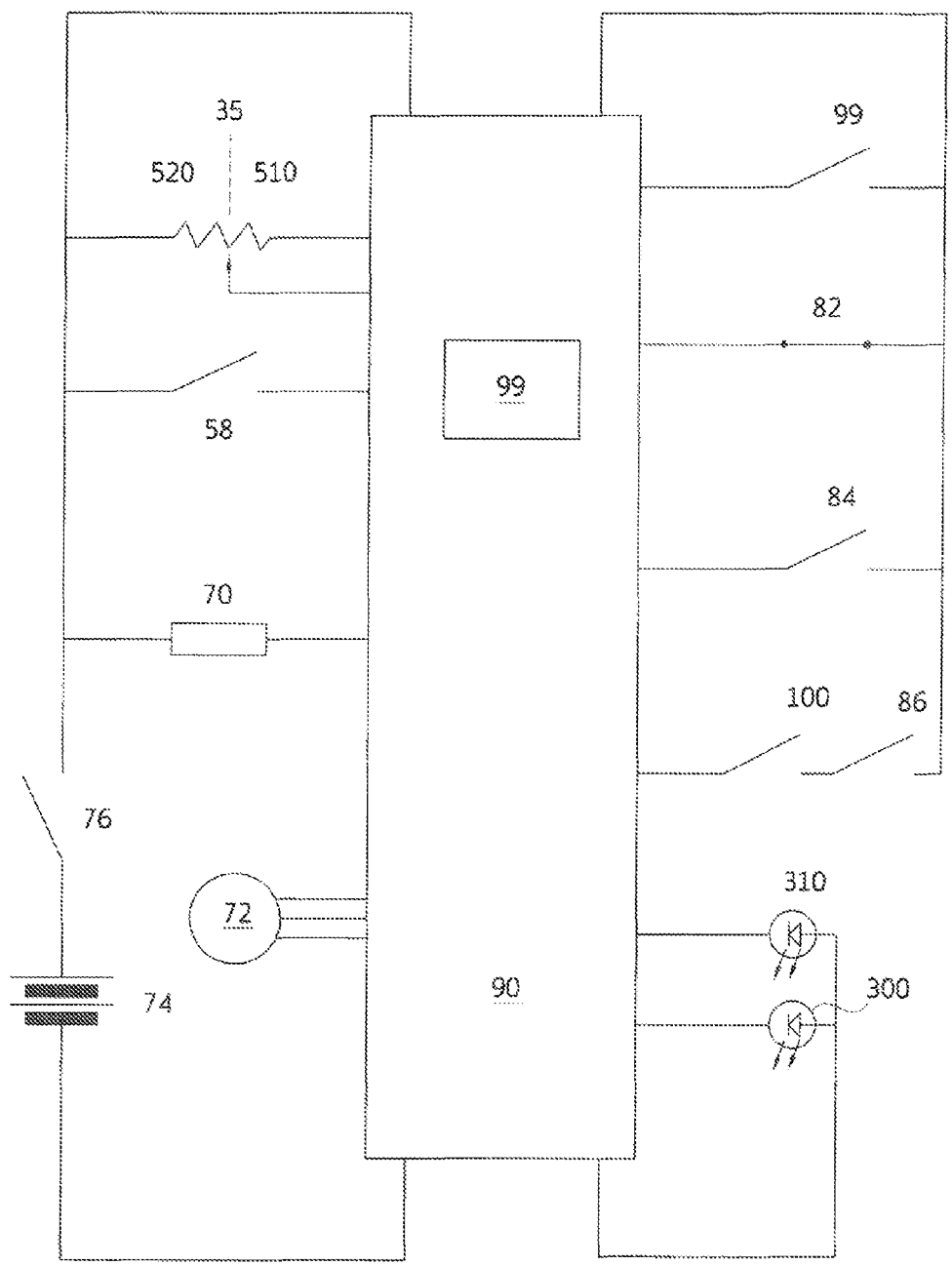
FIG. 4 is an electric schematic showing the interaction of the components of the tiller guided industrial walkie truck; and, FIGS. 5A and 5B depict flow charts showing the operational flow in which the holding device is not engaged (FIG. 5A) and in which the holding device is engaged (FIG. 5B).

FIG. 4 shows an electric schematic illustrating how the operator of the tiller guided industrial walkie truck can use the various controls to achieve the different operating modes disclosed herein. Vehicle control unit 90 processes the operator inputs provided by the various controls, which can include, but are not limited to, buttons, throttles, and switches as well as motion, direction, and position sensors. The speed of the industrial truck can be adjusted in forward direction 510 and reverse direction 520 direction using travel speed controller 35. High speed travel button 58, when being actuated, allows to accelerate the industrial truck up to the maximum speed using travel speed controller 35. An electrical brake, which includes brake coil 70, is used to brake wheel 20 and to slow down or bring the industrial truck to a stop. The electrical break is engaged by pushing break switch 80. Drive motor 72 acts on wheel 20 and is powered by the battery 74. A key must be inserted into key switch 76 to start up the industrial truck. Actuating break switch 30 brakes the truck when the tiller arm is in position 22. As soon as the tiller arm reaches its horizontal position 26, stop switch 82 is closed and the truck is immediately brought to a stop. A sensor 86 is provided to sense if the wheel 20 is centered, in which case the jog button 56 can be used to accelerate the industrial truck up to the walk along speed. The holding device is activated by rotating knob 32.

The vehicle control 90 comprises a control circuit 99 that senses whether the travel speed controller 35 is being actuated while the holding device is activated and also the high speed travel button 58 is being actuated. In this case, a dead man's switch is provided in that the brake is engaged if the operator lets go of the travel speed controller.

Figure 5A:
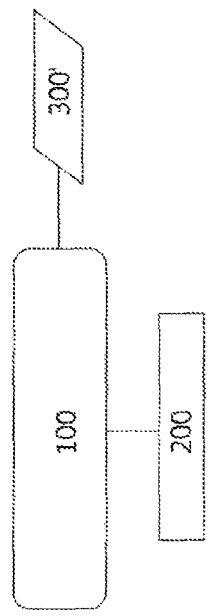
Figure 5B:
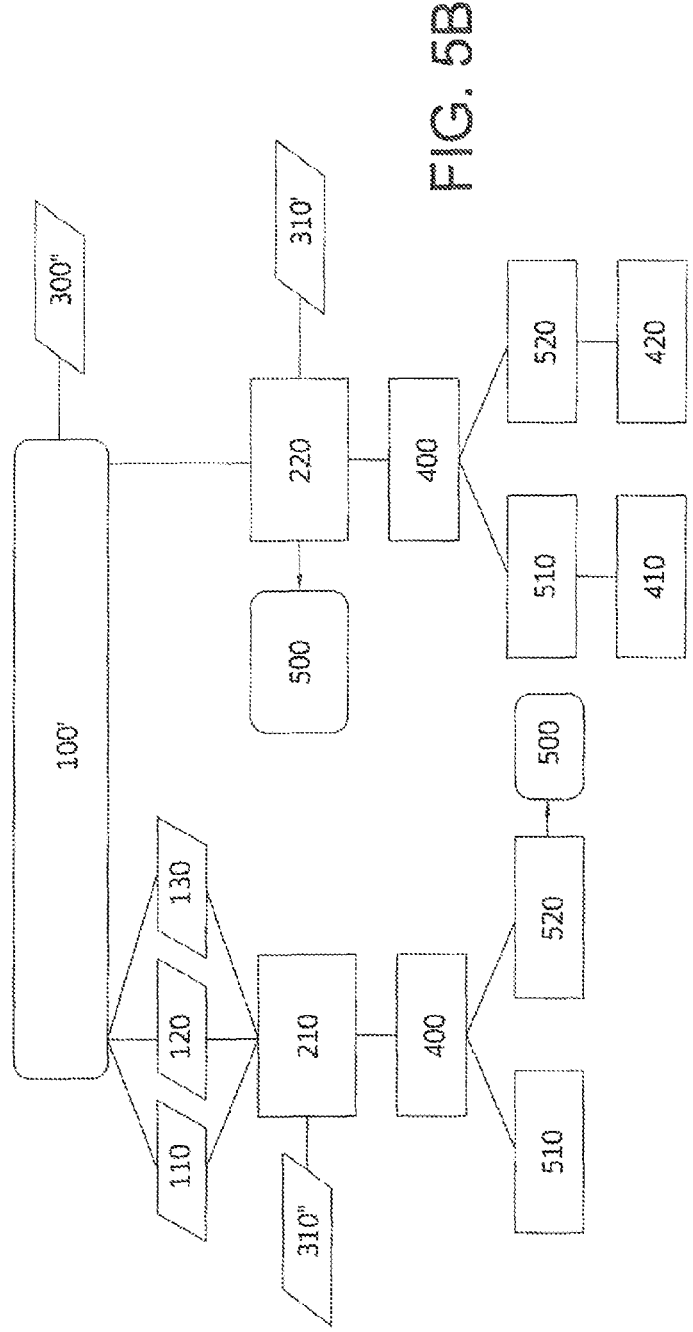

FIGS. 5A and 5B provide flow charts of how to utilize the holding device to operate the industrial truck. In particular, FIG. 5A describes the operational mode 100 in which turn knob 32 is in its default position and the holding device is not engaged. In this mode, standard industrial truck operation 200 applies and LED 300 is in its off state 300'.

FIG. 5B describes the operational mode 100' in which turn knob 32 is rotated out of its default position and in which the holding device is engaged such that tiller arm 22 can be held in the snap-in position 24. LED 300 changes to LED state 300", in which the LED flashes. Typically, LED 300 is yellow.

Pushing either jog button 56, pro-pick button 120, or coast button 130 activates the coasting mode 210 of the industrial truck. In coasting mode 210, coast LED 310 changes to LED mode 310" in which the LED is flashing. Typically, LED 310 is a blue LED. The travel speed is limited to the walk along speed 400. In the exemplary embodiment shown in FIG. 5B the walk along speed is 5.6 km/h. The industrial truck can travel in a forward direction 510, which is the direction in which the tiller arm is pointing forward. When traveling in the reverse direction 520, i.e., the direction in which the load forks 16 are pointing forward, the industrial truck comes to a full stop 500 if the operator moves the travel speed controller 58 to neutral or lets go of the travel speed controller 58.

If neither jog button 56, pro-pick button 120, or coast button 130 is pushed while the holding device is engaged, the industrial truck is in operational, mode 220 in which coasting does not occur. In this operational mode, coast LED 310 is off, i.e., is in LED state 310'. In operational mode 220, the industrial truck comes to a full stop 500 when the operator lets go of the travel speed controller. Further, the travel speed is limited to walk along speed 400, unless the fast travel button 58 is continuously pressed, which overwrites the limitation to walk along speed. The actual maximum speed is dependent on the direction of travel of the industrial truck. In the forward direction 510, the maximum speed is 15 km/h. In the reverse direction 520, the maximum speed is 9 km/h.

The following also describes the operational procedure for the entering and operating in the coast mode.

1. To be able to enter coast mode:
   the lock device must be rotated (approximately 45°) in line with the tiller arm;
   and the truck must be traveling at less than walk speed in the tiller direction or be at a standstill;
   and either the tiller jog button, the pro-pick button or the coast button on the grab bar must be pressed once;
   and the tiller needs to be in a non-horizontal and non-vertical position.
2. If the truck is in coast mode these actions deactivate coast mode:
   pressing the fast travel button on the grab bar;
   rotating the lock device out of line with the tiller;
   pressing the coast button on the grab bar;
   pressing the stop button beside the pro-pick button or pressing the stop button on the tiller head;
   no commanded input for a defined period of time;
   moving the tiller to the vertical or horizontal position.
3. If the turn knob is rotated (approximately 45°) in line with the tiller the following applies:
   a LED flashes on the turtle cover at a predefined frequency;
   the travel speed is limited to maximum walk along speed or less unless the fast travel button is continuously held which would allow max travel speed;
   the tiller can be locked in a non-horizontal and non-vertical angle;
   if the truck is moved forward or reverse with the tiller throttle control and coast mode is not active, releasing the throttle will cause the brake after a short delay to be applied regardless of what speed the truck was traveling previously or whether or not the tiller is locked in the non-horizontal/non-vertical angle.

It is understood that the foregoing description is that of the preferred embodiments of the invention and that various changes and modifications may be made thereto without departing from the spirit and scope of the invention as defined in the appended claims.

What is claimed is:

1. A tiller guided industrial truck comprising:
   a steered wheel;
   a tiller arm configured to be pivotal about a vertical axis so as to determine a steering angle for said steered wheel and to be pivotal about a horizontal axis between a horizontal position and a vertical position;
   said tiller arm being pretensioned toward said vertical position;
   a travel speed controller disposed on said tiller arm;
   an actuating unit;
   a holding device for said tiller arm which can be activated via said actuating unit;
   said holding device providing, when activated via said actuating unit, a snap-in position for said tiller arm in which said tiller arm is held;
   said snap-in position being provided between said horizontal position and said vertical position;
   said holding device being configured to, when activated, limit a maximum travel speed of said industrial truck to a walk along speed unless said high speed travel button is also actuated concurrently;
   said tiller arm being configured to remain in said snap-in position when said high speed travel button is actuated; and,
   a control circuit configured to initialize a braking process of said industrial truck when said travel speed controller is not actuated while said holding device is activated and said high speed travel button is actuated.
2. The industrial truck of claim 1, wherein said tiller arm is released from said snap-in position by a pivoting of said tiller arm about said horizontal axis.
3. The industrial truck of claim 1, wherein said tiller arm is released from said snap-in position by an upward pivot motion of said tiller arm and automatically returns to said vertical position of said tiller arm.
4. The industrial truck of claim 3, wherein said return to said vertical position triggers a braking process.
5. The industrial truck of claim 1, wherein said tiller arm is released from said snap-in position by a downward pivot movement and triggers a braking operation as a result of a complete downward pivot movement.
6. The industrial truck of claim 4, further comprising:
   an electric brake configured to brake said industrial truck when said tiller arm is in said vertical position.
7. The industrial truck of claim 1, further comprising:
   a retaining pin which defines a longitudinal direction and is movable in said longitudinal direction;
   said holding device having a rotatable actuating element configured to coact with said retaining pin; and,
   said retaining pin being configured to be directed toward said tiller arm in a first position thereof when said holding device is activated and to be rotated out of said first position into a second position directed away from said tiller arm when said holding device is not activated.
8. The industrial truck of claim 7, wherein;
   said tiller arm has an end directed toward said holding device;
   said tiller arm has a cam on said end directed toward said holding device; and,
   said cam rests against said retaining pin when said tiller arm is in said snap-in position and prevents a pivoting of said tiller arm into said vertical position.
9. The industrial truck of claim 7, wherein:
   said holding device has a position switch configured to detect a rotational position of said actuating element which activates said holding device and triggers a limiting of said maximum travel speed to said walk along speed.
10. The industrial truck of claim 1, further comprising an operator platform.
11. The industrial truck of claim 1, wherein said walk along speed is or from 4 km/h to 8 km/h.
12. The industrial truck of claim 11, wherein said walk along speed is 5.6 km/h.
13. The industrial truck of claim 1, wherein said maximum travel speed is of from 8.1 km/h to 16 km/h.
14. The industrial truck of claim 13, wherein said maximum travel speed is 9 km/h.
15. The industrial truck of claim 13, wherein said maximum travel speed is 15 km/h.

* * * * *

UNITED STATES PATENT AND TRADEMARK OFFICE
CERTIFICATE OF CORRECTION

| | | |
|---|---|---|
| PATENT NO. | : 8,875,818 B2 | Page 1 of 1 |
| APPLICATION NO. | : 13/889845 | |
| DATED | : November 4, 2014 | |
| INVENTOR(S) | : Monte Grison, Scott Tosten and Carsten Harnisch | |

It is certified that error appears in the above-identified patent and that said Letters Patent is hereby corrected as shown below:

In the Specification

In Column 3:
Line 46: delete "8 kg/h" and insert -- 8 km/h -- therefor.

In Column 4:
Line 51: delete "foe" and insert -- be -- therefor.

In Column 6:
Line 22: delete "switch 30" and insert -- switch 80 -- therefor.

Signed and Sealed this
Twenty-fourth Day of February, 2015

Michelle K. Lee
*Deputy Director of the United States Patent and Trademark Office*